US012349186B2

United States Patent
Lin et al.

(10) Patent No.: US 12,349,186 B2
(45) Date of Patent: Jul. 1, 2025

(54) METHOD OF LOGICAL CHANNEL PRIORITIZATION TO SUPPORT SIDELINK RELAY

(71) Applicant: MediaTek INC

(72) Inventors: Guan-Yu Lin, Hsin-Chu (TW); Ming-Yuan Cheng, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 394 days.

(21) Appl. No.: 17/860,624

(22) Filed: Jul. 8, 2022

(65) Prior Publication Data

US 2022/0346112 A1 Oct. 27, 2022

Related U.S. Application Data

(63) Continuation of application No. PCT/CN2021/075743, filed on Feb. 7, 2021.
(Continued)

(51) Int. Cl.
*H04W 72/566* (2023.01)
*H04W 72/1263* (2023.01)
*H04W 92/18* (2009.01)

(52) U.S. Cl.
CPC ..... *H04W 72/569* (2023.01); *H04W 72/1263* (2013.01); *H04W 92/18* (2013.01)

(58) Field of Classification Search
CPC .............. H04W 72/569; H04W 72/1263; H04W 92/18
See application file for complete search history.

(56) References Cited

U.S. PATENT DOCUMENTS

2016/0338094 A1\* 11/2016 Faurie .................. H04W 72/04
2019/0053215 A1\* 2/2019 Yu ...................... H04B 7/15542
(Continued)

FOREIGN PATENT DOCUMENTS

CN 110771245 A 2/2020
CN 111867082 A \* 10/2020 ............ H04W 72/02
(Continued)

OTHER PUBLICATIONS

PCT Search Report and Written Opinion of PCT/CN2021/075743, mailed on Apr. 27, 2021 (9 pages).

*Primary Examiner* — Sujoy K Kundu
*Assistant Examiner* — Vladislav Y Agureyev
(74) *Attorney, Agent, or Firm* — Helen Mao; Zheng Jin; Imperium Patent Works

(57) ABSTRACT

A method of UE prioritizing and multiplexing simultaneous sidelink relay data for Logical Channel Prioritization (LCP) procedure in new radio (NR) system is proposed. UE can provide traffic prioritization based on traffic category when UE has simultaneous traffic from more than one traffic categories to transmit. The sidelink relay traffic prioritization is then used for transmission interface and resource selection, and data multiplexing prioritization on the basis of sidelink relay architecture. Specifically, a method on how to perform the corresponding logical channel prioritization (LCP) operation for MAC PDU multiplexing is provided. LCP restriction is considered to determine which classes of traffic can be multiplexed into the same MAC PDU together. Priority of multiplexing is also applied to determine the order and the amount of traffic to be included in the MAC PDU.

18 Claims, 5 Drawing Sheets

Related U.S. Application Data

(60) Provisional application No. 62/982,119, filed on Feb. 27, 2020, provisional application No. 62/972,088, filed on Feb. 10, 2020.

(56) References Cited

U.S. PATENT DOCUMENTS

| | | | |
|---|---|---|---|
| 2019/0082459 A1* | 3/2019 | Faurie | H04W 72/20 |
| 2020/0008183 A1 | 1/2020 | Chen et al. | H04W 72/048 |
| 2021/0029723 A1* | 1/2021 | Wu | H04W 72/569 |
| 2021/0051511 A1* | 2/2021 | Ali | H04W 4/40 |
| 2021/0105743 A1* | 4/2021 | Lin | H04W 72/02 |
| 2021/0153065 A1* | 5/2021 | Adjakple | H04W 28/0268 |
| 2021/0153169 A1* | 5/2021 | Lin | H04L 5/006 |
| 2022/0022168 A1* | 1/2022 | Wang | H04L 5/0053 |
| 2022/0053464 A1* | 2/2022 | Yu | H04W 72/04 |
| 2022/0173840 A1* | 6/2022 | Wang | H04L 5/0055 |

FOREIGN PATENT DOCUMENTS

| | | | | |
|---|---|---|---|---|
| CN | 112399588 A * | 2/2021 | | H04L 1/1812 |
| EP | 3826356 A1 * | 5/2021 | | H04W 28/02 |
| WO | WO2018/232034 A1 | 12/2018 | | |

* cited by examiner

TRAFFIC PRIORITIZATION TO DETERMINE
THE HIGHEST PRIORITY TRAFFIC

RESOURCE SELECTION FOR THE HIGHEST
PRIORITY TRAFFIC

LCP RESTRICTION FOR MULTIPLEXING
INTO SAME MAC PDU

PRIORITY OF MULTIPLEXING TO DETERMINE
ORDER AND AMOUNT OF MAC PDU

METHOD OF LOGICAL CHANNEL PRIORITIZATION TO SUPPORT SIDELINK RELAY

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/075743, with an international filing date of Feb. 7, 2021, which in turn claims priority from U.S. Provisional Application No. 62/972,088, filed on Feb. 10, 2020, and U.S. Provisional Application No. 62/982,119, filed on Feb. 27, 2020. This application is a continuation of International Application No. PCT/CN2021/075743, which claims priority from U.S. provisional applications 62/972,088 and 62/982,119. International Application No. PCT/CN2021/075743 is pending as of the filing date of this application, and the United States is a designated state in International Application No. PCT/CN2021/075743. The disclosure of each of the foregoing documents is incorporated herein by reference.

TECHNICAL FIELD

The disclosed embodiments relate generally to wireless network communications, and, more particularly, to logical channel prioritization (LCP) procedure enhancement to support sidelink transmission in 5G new radio (NR) wireless communications systems.

BACKGROUND

In various communications scenarios, it is desirable for mobile devices to communicate directly with others, without depending on network infrastructure as an intermediary. This situation motivates the design of a so-called "sidelink" interface directly between mobile devices, e.g. from one user equipment (UE) to another UE, without going through a base station. In some situations, use of the sidelink interface may be wholly or partly controlled by a base station, e.g. the use of sidelink radio resources may be scheduled by the base station, but the actual communication of data on the sidelink does not pass through the base station. The sidelink interface is also referred to as a PC5 interface. A variety of applications may rely on communication over the sidelink interface, such as vehicle-to-everything (V2X) communication, public safety (PS) communication, direct file transfer between user devices.

Sidelink relay, as an extension of sidelink communication, enable a UE to communicate with the network via another UE, i.e., one UE can help another UE to forward/relay data to/from base station (UE-to-Network Relay). To be specific, for a remote UE, it is allowed to access network without direct communicate with base station via Uu interface. A sidelink relay connection may be configured by a configuration message sent from base station through relay UE to remote UE; the configuration message may include any necessary parameters for relay operation, as well as other parameters needed to set up and maintain the connection. In some other cases, however, there may be a need for two remote UEs to communicate when they do not have direct visibility to each other over the sidelink interface. In these cases a relay UE can provide relayed communication between the two remote UEs (UE-to-UE Relay).

There are potential problems in the current LTE and new radio (NR) vehicle-to-everything (V2X) design to support sidelink relay transmission. It is unclear how a transmitter UE can perform sidelink logical channel prioritization (LCP) and data multiplexing for traffic from different source entities (network or remote UEs), and/or via different interface (Uu or PC5 interface), and/or for different application (sidelink relay or NR V2X). A solution is sought.

SUMMARY

A method of UE prioritizing and multiplexing simultaneous sidelink relay data for Logical Channel Prioritization (LCP) procedure in new radio (NR) system is proposed. The UE differentiates traffic based on traffic direction, ownership, and used interface into different categories. The UE may be configured with a specific priority order for some or all of the traffic categories, so that when UE has simultaneous traffic from more than one traffic categories to transmit, the UE can provide prioritization to those traffic categories with a higher category priority based on the category priority order. The sidelink relay traffic prioritization is then used for transmission interface and resource selection, and/or data multiplexing prioritization on the basis of sidelink relay architecture. Specifically, a method on how to perform the corresponding logical channel prioritization (LCP) operation for MAC PDU multiplexing is provided. LCP restriction needs to be considered to determine which classes of traffic can be multiplexed into the same MAC PDU together. Priority of multiplexing also needs to be applied to determine the order and the amount of traffic to be included in the MAC PDU.

In one embodiment, a transmitter UE (e.g., a relay UE) establishes a plurality of sidelink logical channels (LCHs) for sidelink communication. The plurality of LCHs are associated with data for transmission by the UE. The relay UE determines an LCH having a highest-priority traffic. The determination is based at least on a traffic category of each traffic. The traffic category is determined based on a traffic direction, a traffic owner, and a transmission interface. The relay UE selects LCHs that have data available and are allowed to be multiplexed with the highest-priority LCH to construct a MAC PDU for transmission. The relay UE transmits the MAC PDU over allocated resource for the selected LCHs. The resource is allocated to construct the MAC PDU by multiplexing data from the selected LCHs in a multiplexing order.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
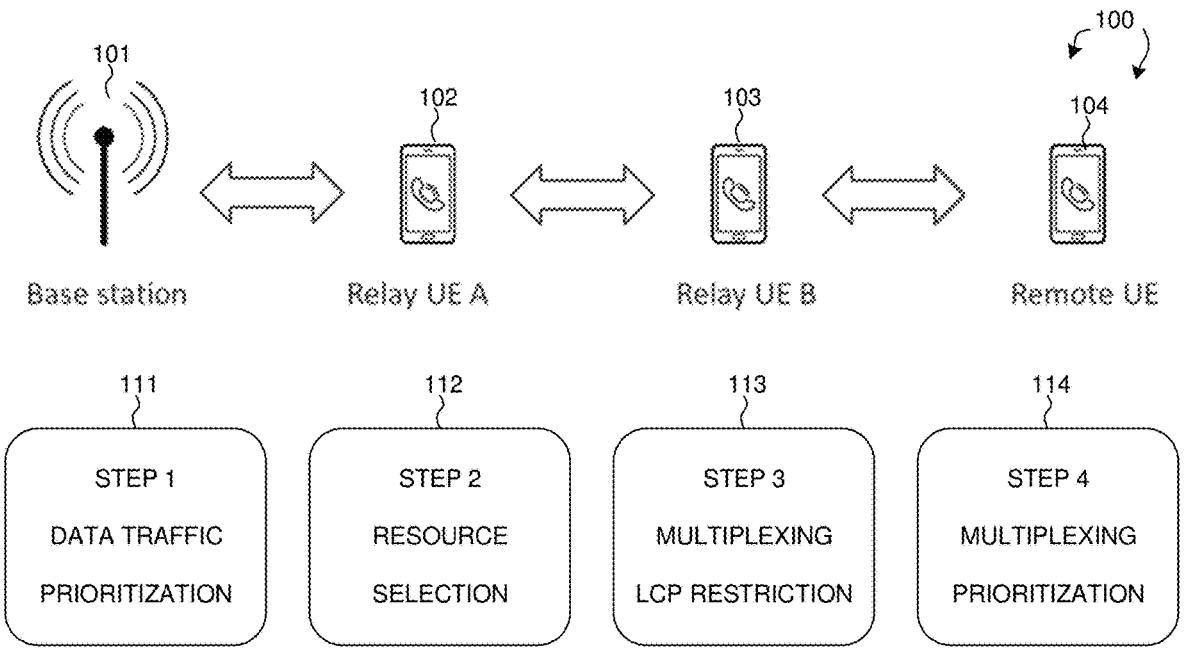
FIG. 1 illustrates a wireless communications system with logical channel prioritization (LCP) enhancement to support sidelink relay in accordance with a novel aspect.

FIG. 1 illustrates a wireless communications network 100 supporting enhancement of sidelink logical channel prioritization (LCP) for sidelink in accordance with a novel aspect. FIG. 1 is an example of sidelink relay, in which a remote UE 104 communicate with a base station gNB 101 via the sidelink relay of relay UE 102 (UE A) and relay UE 103 (UE B). A relay UE means a UE who is responsible for forwarding Uu traffic from other UE/base station to base station/other UE. In contrast, a remote UE is a UE whose Uu traffic is relayed via the forwarding of relay UE. For a relay UE that can directly communicate with the base station via Uu interface, referred as UE-to-NW relay, which means this relay directly forwards traffic to the network via Uu interface. In addition, UE A is an upstream relay UE of relay UE B, because data of relay UE B is forwarded via relay UE A and relay UE A is (one-hop) closer to the base station compared to relay UE B. Similarly, UE B is a downstream relay UE of relay UE A because relay UE B is (one-hop) closer to the remote UE than relay UE A.

In sidelink communication for relay (i.e. sidelink relay) scenario, from the transmitter UE perspective, sidelink traffic could be classified based on (1) traffic direction, (2) traffic owner, and (3) transmission interface. In sidelink relay, the traffic direction can be uplink (UL) (i.e. traffic is for uplink, forwarded to gNB), downlink (DL) (i.e. traffic is for downlink, forwarded to a remote UE or another relay UE), and sidelink (SL) (i.e. traffic is to be forwarded to another peer UE without relay via a base station or network node on the routing path). The traffic owner, from the transmitter UE perspective, could be the transmitter UE itself or could be other UE (i.e. the transmitter UE relay data for other remote UE or other UE-to-UE relay). As for transmission interface, it means the link from this transmitter UE to the next-hop UE/gNB, and could be Uu interface or PC5 interface, where a UE-to-NW relay UE can directly communicate with the base station via Uu interface, while a UE-to-UE relay UE or a remote UE may not have available Uu interface. In UE-to-Network relay, a remote UE can communicate with at least one relay UE via PC5 interface.

Traffic prioritization and multiplexing within a UE is a performed in MAC layer. A UE first selects data from logical channels (LCHs) associated with different priorities, and multiplex them into a single MAC PDU. The UE then delivers the MAC PDU to physical (PHY) layer for transmission. In sidelink communication, prioritization rule is required for transmission interface selection and data multiplexing. For example, a UE may simultaneously have uplink and sidelink transmission to be transmitted on different interfaces. If the UE is not capable of transmitting data on two interfaces at the same time, the UE needs to do traffic prioritization, i.e. select to transmit one of UL traffic and SL traffic with a higher priority. In another example, a relay UE may simultaneously have its own UL traffic and UL traffic from remote UE for relay. In this case, although both UL traffic from the relay UE itself or from the remote UE are transmitted via Uu interface, the relay UE still need a clear prioritization rule to determine the order of data multiplexing, i.e., which data can be put into the available UL grant first.

In accordance with one novel aspect, a method for traffic prioritization for sidelink relay in a UE is provided. The UE differentiates traffic types within itself based on traffic direction, ownership, and used interface into different categories. The UE may be configured with a specific priority order for some or all of the traffic categories, so that when UE has simultaneous traffic from more than one traffic categories to transmit, UE can provide prioritization to those traffic categories with a higher category priority based on the category priority order. The UE can further differentiates traffic within same category into high priority traffic and low priority traffic based on threshold(s). The threshold(s) can be configured/pre-configured by network via dedicated RRC signalling, SIB or pre-configuration. The UE priorities high priority traffic over low priority traffic. The UE priorities certain traffic types over other traffic types based on priority level.

The sidelink relay traffic prioritization is then used for transmission interface and resource selection, and/or data multiplexing prioritization on the basis of sidelink relay architecture. Accordingly, a method is provided to determine whether to support multiplex when there are simultaneous sidelink relay data from different remote UE, or when there are simultaneous sidelink relay data and NR-V2X traffic. Specifically, a method on how to perform the corresponding logical channel prioritization (LCP) operation for MAC PDU multiplexing is provided. LCP restriction needs to be considered to determine which classes of traffic can be multiplexed into the same MAC PDU together. The LCP restrictions includes whether it is allowed to multiplex data of sidelink logical channels whose traffic is from different source UEs, from different next-hop UE, and/or belongs to different traffic category. Priority of multiplexing needs to be applied to determine the order and the amount of traffic to be included in a MAC PDU. The priority depends on one or more of the following factors: (1) logical channel priority; (2) logical channel priority level; (3) associated traffic category; (4) Bj, which identify the amount of traffic that should be transmitted to fulfill the requirement of transmission rate; (5) delay or QoS related parameters.

In the example of FIG. 1, a four-step method of prioritizing and multiplexing simultaneous sidelink relay data for UE sidelink Logical Channel Prioritization (LCP) procedure in new radio (NR) sidelink relay is proposed. In step 1 (111), the UE performs traffic prioritization to determine the highest priority traffic from different traffic categories (classes) to transmit. In step 2 (112), the UE selects transmission resource based on the determined highest priority traffic. In step 3 (113), the UE applies LCP restriction to determine which classes of traffic can be multiplexed into the same MAC PDU together with the highest priority traffic. In step 4 (114), the UE determines the priority of data multiplexing, e.g., the order and the amount of traffic to be included on a MAC PDU for transmission.

Figure 2:
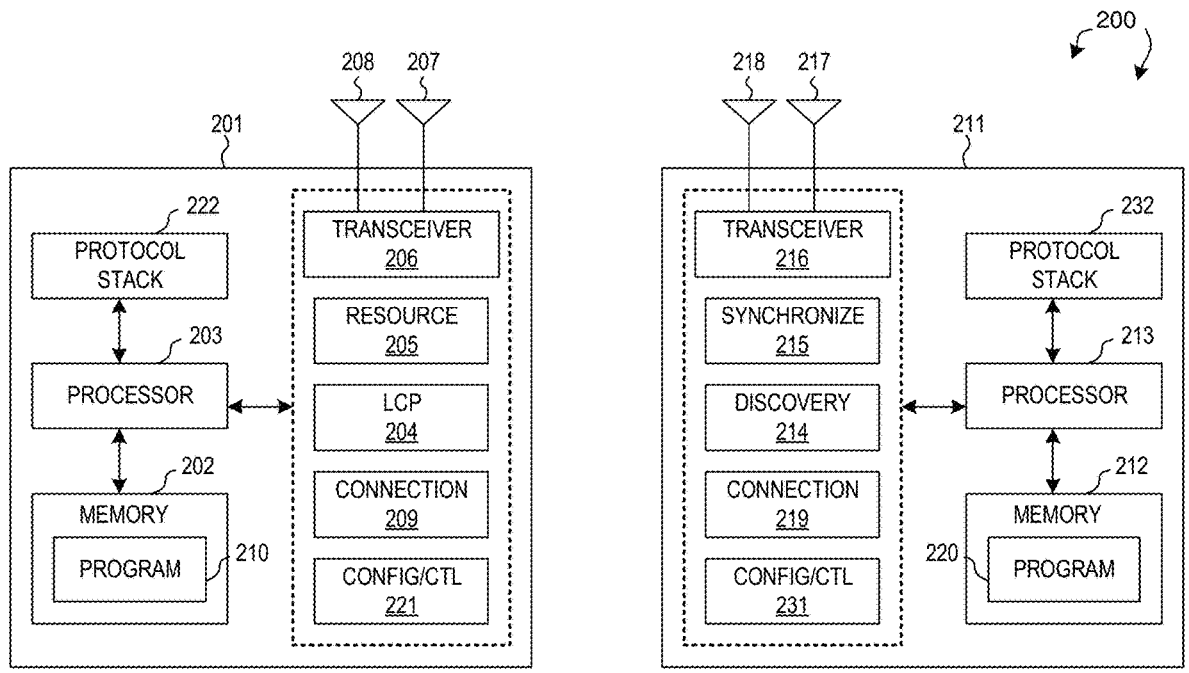
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a base station or a relay UE), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a remote user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a relay or TX UE that includes a protocol stack 222, a resource management circuit 205 for allocating and scheduling sidelink resource, an LCP handling module 204 for performing LCP with LCP restriction and priority multiplexing, a connection/LCH handling circuit 209 for establish connections and logical channels with base stations and remote UEs, and a control and configuration circuit 221 for providing control and configuration information. Wireless device 211 is a remote or RX UE that includes a protocol stack 232, a synchronization handling circuit 215, a relay discovery circuit 214 for discovering relay UEs, a connection handling circuit 219 for establishing sidelink connections, and a configuration and control circuit 231. The different functional modules and circuits can be implemented and configured by software, firmware, hardware, and any combination thereof. The function modules and circuits, when executed by the processors 203 and 213 (e.g., via executing program codes 210 and 220), allow relay UE 201 and remote UE 211 to perform embodiments of the present invention accordingly. In one example, the relay UE 201 provides traffic prioritization based on traffic category when UE 201 has simultaneous traffic from more than one traffic categories to transmit. The sidelink relay traffic prioritization is then used for transmission interface and resource selection, and data multiplexing prioritization on the basis of sidelink relay architecture.

Figure 3:
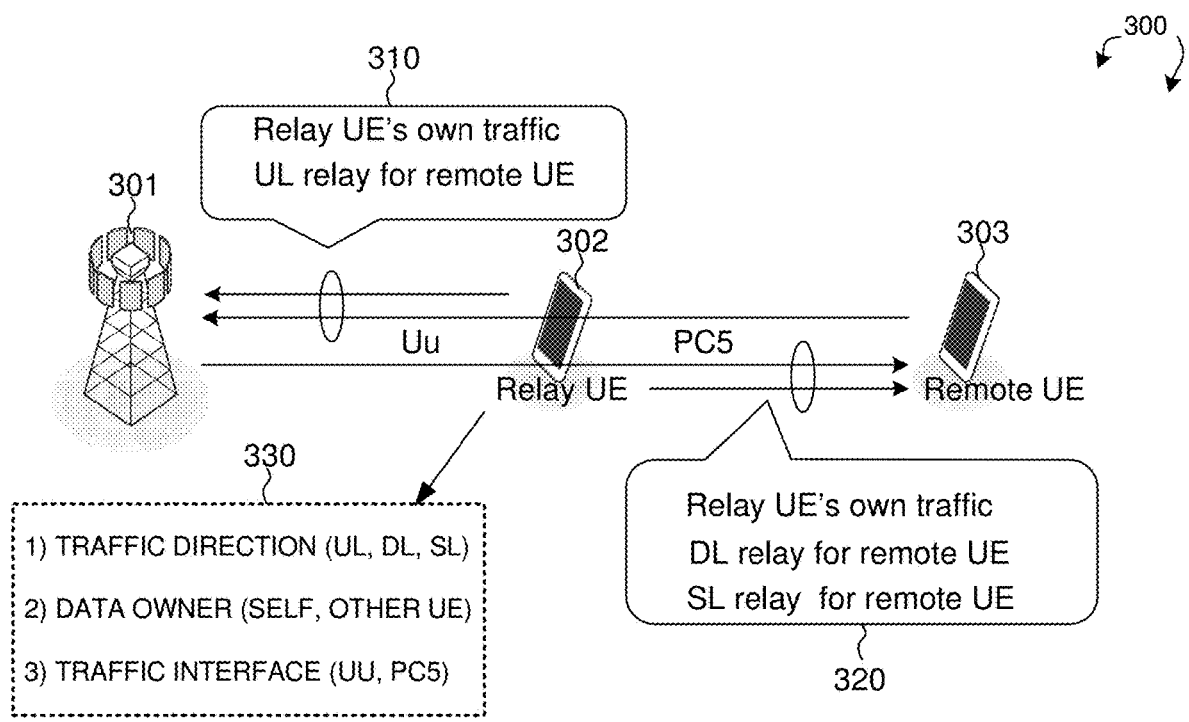
FIG. 3 illustrates examples of different traffics in NR network with sidelink relay, uplink, downlink among base station, relay UE, and remote UE.

FIG. 3 illustrates examples of different traffics in NR network 300 with sidelink relay, uplink, downlink among base station, relay UE, and remote UE. A basic NR UE-to-Network relay architecture 300 comprises a base station gNB 301, a relay UE 302, and a remote UE 303. From the transmitter UE perspective, e.g., relay UE 302, sidelink traffic could be classified based on three classification criterion (as depicted in 330): (1) traffic direction (UL, DL, or SL), (2) traffic owner (UE itself or other UE), and (3) transmission interface (Uu interface, or sidelink PC5 interface). In the example of FIG. 3, for traffic depicted by 310, it can be relay UE's own traffic or UL relay for remote UE 303, over Uu interface or PC5. For traffic depicted by 320, it can be relay UE's own traffic, or DL relay for remote UE 303, or SL relay for remote UE 303.

Based on the three classification criterion, there are seven valid traffic categories: (1) UL traffic of the transmitter UE itself via Uu interface (UL-Self-Uu), (2) UL traffic of the transmitter UE itself via PC5 interface (UL-Self-PC5), (3) UL traffic of other UE for relay via Uu interface (UL-Other-Uu), (4) UL traffic of other UE for relay via PC5 interface (UL-Other-PC5), (5) DL traffic of other UE for relay via PC5 interface (DL-Other-PC5), (6) SL traffic of the transmitter UE itself (e.g. NR-V2X traffic or LTE-V2X traffic) via PC5 (SL-Self-PC5), and (7) SL traffic of the other UE for relay (e.g. NR-V2X traffic) via PC5 (SL-Other-PC5).

Figure 4:
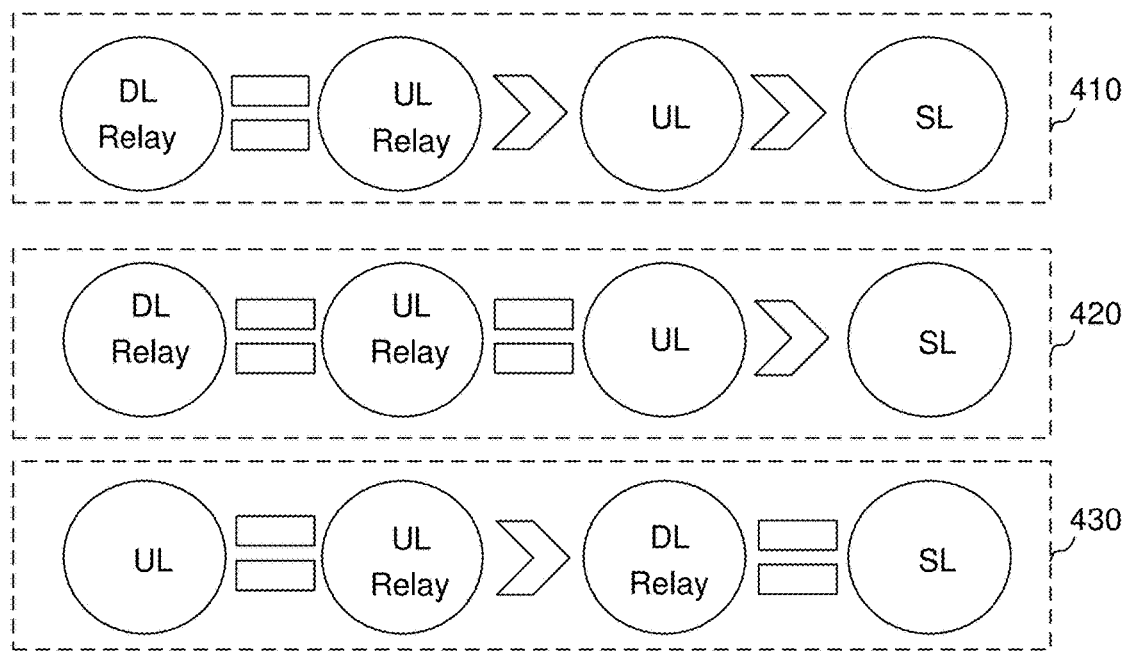
FIG. 4 illustrates examples of determining traffic priority based on traffic categories.

FIG. 4 illustrates examples of determining traffic priority based on traffic categories. UE may be configured with a specific priority order for some or all of the traffic categories. In the example of FIG. 4, four simplified traffic categories, e.g., UL, UL relay, DL relay, and DL, are compared with different priority rules. In a first applicable scenario (410), relay traffic is prioritized over relay UE's own traffic, e.g., DL relay=UL relay>UL>SL. In a second applicable scenario (420), UL/DL traffic is prioritized over SL V2X traffic, e.g., DL relay=UL relay=UL>SL. In a third applicable scenario (430), Uu interface is prioritized over PC5 interface, e.g., UL=UL relay>DL relay>SL.

Figure 5:
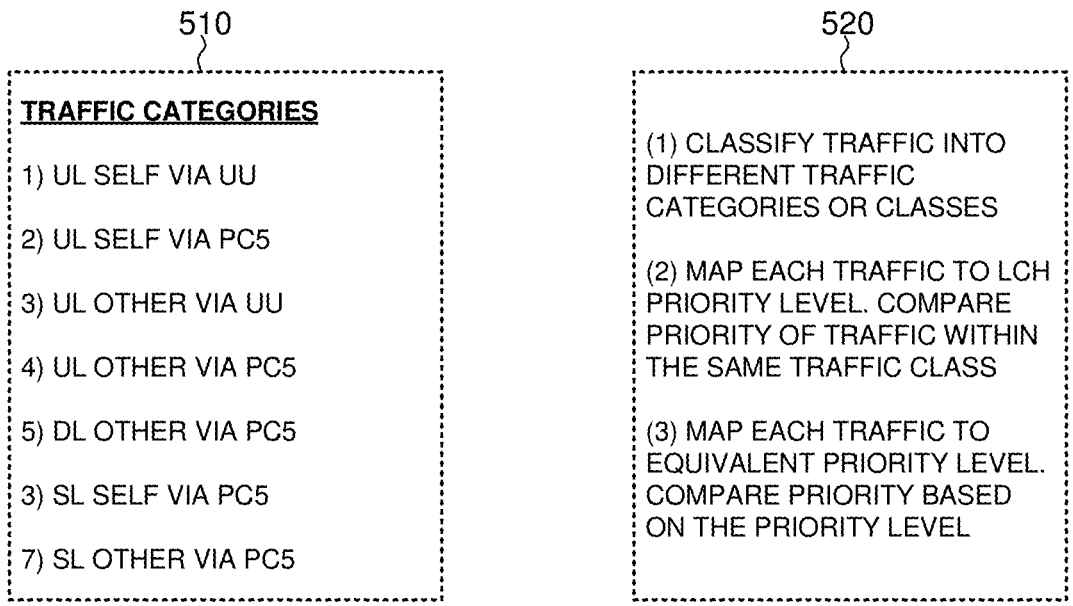
FIG. 5 illustrates a first step of traffic prioritization to determine the highest priority traffic from different traffic categories in accordance with one novel aspect.

FIG. 5 illustrates a first step of traffic prioritization to determine the highest priority traffic from different traffic categories in accordance with one novel aspect. As illustrated earlier in FIG. 3, based on the traffic direction, owner, and used interface, there are seven valid traffic categories as depicted in 510. Each of the traffic categories have their own priority level. For example, there are 16 different priority levels of Uu traffic and 8 different priority levels for sidelink traffic. In order to decide priority of these traffic, a mechanism to directly or indirectly compare their priority level is needed. A mapping rule can be used to compare the priority of traffic belonging to different traffic categories as depicted in 520.

In one embodiment of direct comparison, for traffic categories to be transmitted in the same transmission interface (e.g., PC5), the prioritization can be performed based on direct comparison of sidelink logical channel priority, or the priority value indicated in sidelink control information (SCI). In other words, if two traffic categories are transmitted on the same interface, but are belonging to Uu and SL traffic separately, we can compare the priority of the mapped logical channel on this interface. For example, for DL relay traffic and V2X traffic transmitted on PC5 interface, we can compare the SL LCH priority. That is, although DL relay traffic is Uu traffic, it would be mapped to a SL logical channel when transmitted on PC5 interface. Therefore, the DL relay Uu traffic would have an equivalent SL LCH priority for priority comparison.

In one embodiment of direct comparison, for traffic categories to be transmitted in the same transmission interface (e.g., PC5), the prioritization can be performed based on direct comparison of sidelink logical channel priority along with the traffic owner. For example, there is a SL LCH priority threshold to determine whether the sidelink traffic from the relay UE itself is high priority or low priority, and there is another SL LCH priority threshold to determine whether the sidelink traffic from remote UE(s) is high priority or low priority. The relay UE first classify sidelink traffic into the four categories, and then determine the priority based on the priority order of category, e.g, (from relay, high priority)>(from remote, high priority)>(from relay, low priority)>(from remote, low priority). The same logic can be applied to Uu transmission when a relay have UL data from itself and from remote UE simultaneously for priority comparison.

In one embodiment of direct comparison, for traffic categories belonging to Uu traffic, the prioritization can be performed based on direct comparison of Uu LCH priority (e.g. 16 LCH priority levels). In other words, if two traffic categories are both belonging to Uu but are transmitted on different interface, we can directly compare their Uu priority. For example, UL relay traffic on Uu vs. DL relay traffic on PC5. The LCH priority of the relay traffic can be mapped to Uu priority for priority comparison.

In yet another embodiment of direct comparison, for traffic belonging to Uu traffic and sidelink traffic (e.g. for NR V2X), the prioritization can be performed based on a translation or mapping function across UL traffic and SL traffic. That is, if two traffic are transmitted on different interface and belong to Uu and PC5 traffic separately, a predefined prioritization rule can be used for priority determination without considering whether the traffic is from the relay UE itself or is from remote UE, e.g., using a Uu LCH priority threshold to determine whether the considered Uu traffic is Uu high priority or Uu low priority, using a sidelink LCH priority threshold to determine whether the considered SL traffic is SL high priority or SL low priority, and then determine the priority following the priority order of Uu high priority, SL high priority, Uu low priority, and SL low priority.

Figure 6:
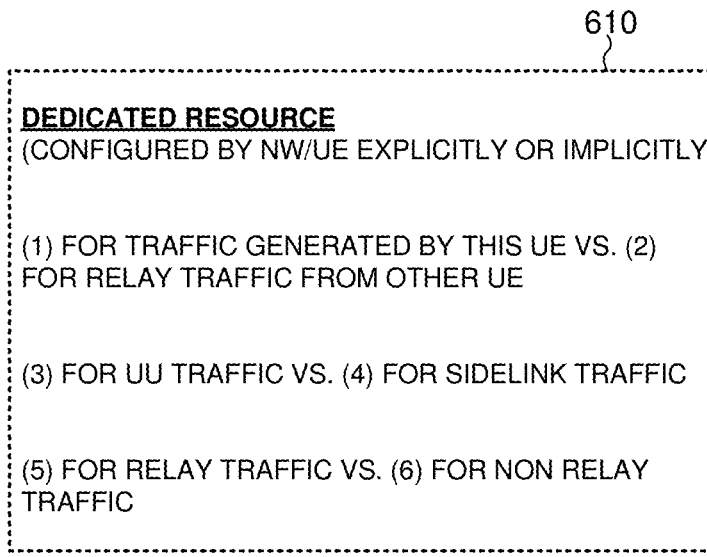
FIG. 6 illustrates a second step of resource selection based on the determined highest priority traffic in accordance with one novel aspect.

FIG. 6 illustrates a second step of resource selection based on the determined highest priority traffic in accordance with one novel aspect. UE may be configured (either by NW or by a scheduler UE) with an uplink/sidelink dedicated resource (610). For example, the resource is dedicated for traffic generated by this UE versus dedicated for relay traffic from other UE; the resource is dedicated for Uu traffic (from or toward gNB) versus dedicated for sidelink traffic (from a UE and toward another UE); the resource is dedicated for relay traffic versus dedicated for non-relay traffic.

The dedicated resource configuration may be configured in an explicitly way or in an implicitly way. Explicitly, for example, a UL configured grant or SL configured grant may be configured in the associated RRC message/MAC CE bit/DCI field upon activation to indicate whether the configured grant is dedicated for traffic owner, traffic type (Uu vs. non-Uu), or relay vs. non-relay. Different configured grants may be associated with different resource configuration. In another example, it is indicated in DCI whether a UL dynamic grant or a SL dynamic grant is dedicated for traffic owner. Implicitly, for example, some resource or resource pool is configured dedicated for relay data. The resource UE selects from a relay-specific resource pool can only be used to transmit relay data.

In one embodiment, the network may configure UE with dedicated resource for transmitting relay data. For uplink transmission, if the highest-priority traffic is relay data, UE should select an UL grant belonging to dedicated resource for relay. UE cannot select an UL resource not belonging to dedicated resource for relay to carry the highest-priority traffic. For sidelink transmission, if the highest-priority traffic is relay data, UE should select an SL grant belonging to dedicated resource for relay. UE cannot select an SL resource not belonging to dedicated resource for relay to carry the highest-priority traffic.

In one embodiment, if radio resource is not specific to relay, UE can use the radio resource to carry either relay traffic or non-relay traffic. In one embodiment, if radio resource is not specific to relay, UE cannot use the radio resource to carry non-relay traffic. In one embodiment, if radio resource is specific to relay, UE can use the radio resource to carry only relay traffic but not non-relay traffic.

In one embodiment, if a radio resource is not dedicated for relay but is prioritized/de-prioritized to relay, UE can use the radio resource to carry either relay traffic or non-relay traffic. During LCP procedure, configuration of this radio resource is taken into account. For example, a UE multiplex non-relay data only after all LCHs with relay data has no more data available for transmission, if the resource is prioritized for relay traffic.

In one embodiment, if radio resource is not specific to Uu traffic, UE can use the radio resource to carry either Uu traffic or sidelink traffic (e.g. for NR-V2X application). In one embodiment, if radio resource is not specific to sidelink traffic, UE can use the radio resource to carry either Uu traffic (UL/DL traffic) or sidelink traffic (e.g. for NR-V2X application).

In one embodiment, if radio resource is not specific to Uu traffic, UE cannot use the radio resource to carry Uu traffic. In one embodiment, if radio resource is not specific to sidelink traffic, UE cannot use the radio resource to carry sidelink traffic.

In one embodiment, if a radio resource is not dedicated for Uu traffic but is prioritized/de-prioritized to Uu traffic, UE can use the radio resource to carry either Uu traffic or sidelink traffic. During LCP procedure, configuration of this radio resource is taken into account. For example, a UE multiplex sidelink traffic only after all LCHs with Uu traffic data has no more data available for transmission, if the resource is prioritized for Uu traffic.

Figure 7:
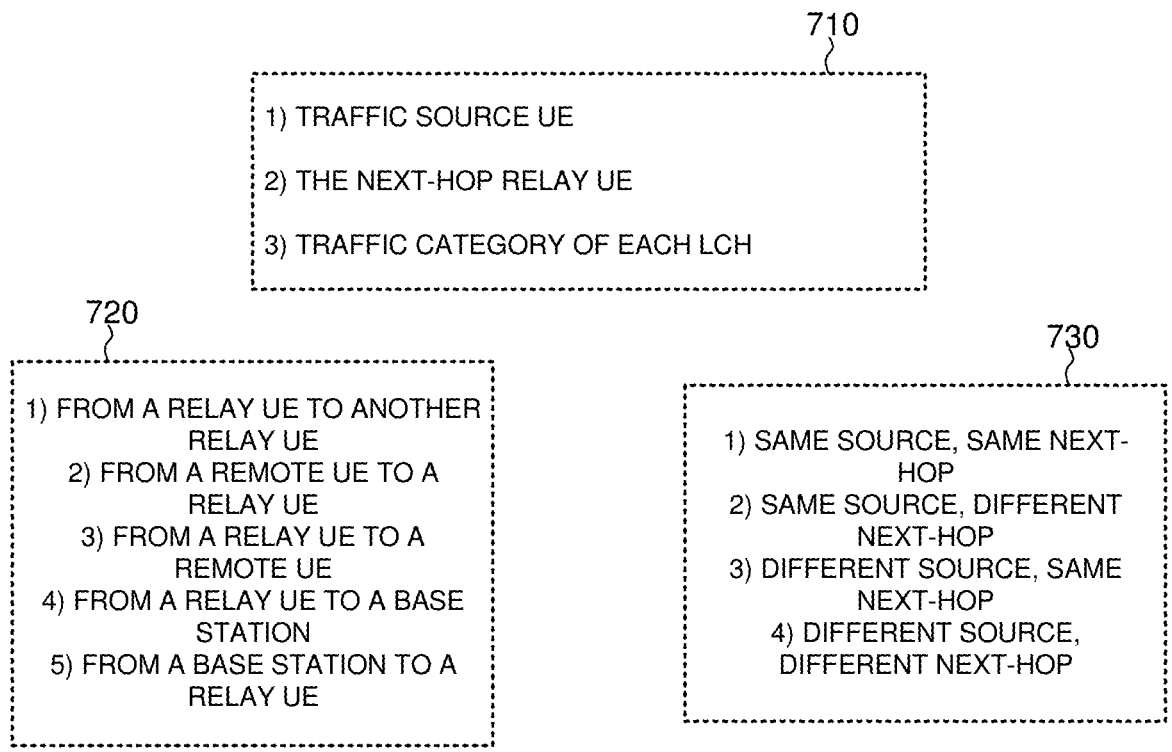
FIG. 7 illustrates a third step of LCP restriction for data multiplexing into the same MAC PDU in accordance with one novel aspect.

FIG. 7 illustrates a third step of LCP restriction for data multiplexing into the same MAC PDU in accordance with one novel aspect. As depicted by 710, LCP/data multiplexing from LCP restrictions considers the following factors: (1) traffic source UE, (2) the next-hop relay UE (including whether the next hop is the base station or the source UE), and (3) traffic category of each logical channels. From hop perspective, a routing path for relay consists of five classes of hop, as depicted by 720. Hop 1: hop from a relay UE to another relay UE, hop 2: hop from a remote UE to a relay UE, hop 3: hop from a relay UE to a remote UE, hop 4: hop from a relay UE to base station, and hop 5: hop from the base station to a relay UE. From the perspective of traffic source and next hop UE, for each transmitter UE the traffic to be transmitted within a single traffic categories can be further classified into 4 scenarios, as depicted by 730. Class 1 scenario—the same source UE, and the same next-hop relay, Class 2 scenario—the same source UE, but different next-hop UE, Class 3 scenario-different source UE and the same next-hop relay, and Class 4 scenario-different source UE and different next-hop relay.

Based on the hop type and whether UE support duplicated relay to multiple next-hop UE, UE may apply rules for LCP restriction, i.e. traffic from different traffic source UE and/or to be forwarded to different next-hop relay UE can or cannot be multiplexed into the same MAC PDU. Besides, traffic from several different traffic categories may or may not be multiplexed into the same MAC PDU. For example, it may be allowed to multiplex UL traffic from the transmitter UE itself and UL traffic for relay from other UE; but it may not be allowed to multiplex Uu relay traffic and SL relay traffic into the same MAC PDU, e.g. in case the network configure separate resource, resource pool, or configured grants for relay traffic and sidelink traffic (e.g. for NR-V2X).

In one example, if two traffic are with different next-hop UE, it is preferred that they are not multiplexed into the same MAC PDU. In one example, if two traffic are from different source UE, it is preferred that they are multiplexed into the same MAC PDU to increase resource utilization. In another example, the traffic for SL relay and for SL V2X should not be multiplexed into the same MAC PDU over PC5 interface, in order to decouple the traffic of V2X and relay. In yet another example, the traffic for SL relay and for relay UE's Uu traffic can be multiplexed into the same MAC PDU over Uu interface to increase resource utilization. In another example, if the resource is dedicated for relay/non-relay traffic, Uu/non-Uu traffic, or UE's own traffic/traffic from other UE (as we mentioned in step 1.5), UE should select only those logical channels which satisfy the restriction of the selected resource for multiplexing. In yet another example, whether SL relay data can be multiplex with other traffic also depends on the detailed content of the relay traffic, e.g., if the packet is for SL relay discovery, it may not be multiplexed with any other SL relay data.

Figure 8:
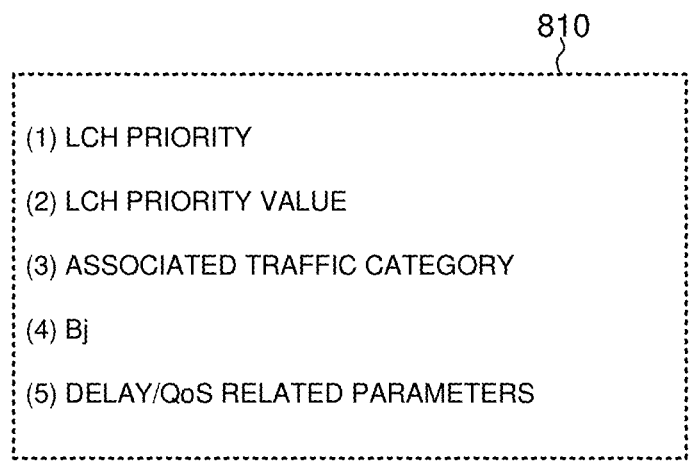
FIG. 8 illustrates a fourth step of priority of data multiplexing to determine order and amount of MAC PDU in accordance with one novel aspect.

FIG. 8 illustrates a fourth step of priority of data multiplexing to determine order and amount of MAC PDU in accordance with one novel aspect. When a TX UE creates a MAC PDU to transmit using the allocated radio resources, the TX UE aims to satisfy the QoS of each configured radio bearer. The TX UE has to decide on the amount of data for each logical channel (LCH) to be included in the MAC PDU. In constructing the MAC PDU with data from multiple LCHs, the data from the highest priority LCH are served first in the MAC PDU, followed by data from the next highest priority LCH, continuing until the MAC PDU space runs out. The LCP procedure of resource allocation for SL LCH includes two rounds: in First round—allocate resource to satisfy Bj based on decreasing priority order (from high-priority SL LCH to low-priority SL LCH); and in Second round—allocate resource to clean all remaining data from based on decreasing priority order until SL resource of this SL grant is exhausted or until no SL LCH has remaining data. SL LCHs configured with equal priority should be served equally.

Several parameters can be considered to determine the how to allocate resource of the uplink/sidelink grant as depicted in 810: 1) logical channel priority (the method for comparing logical channel priority is mentioned before, which consider both the priority value of a logical channel and the traffic category the logical channel belongs to), 2) logical channel priority value, 3) associated traffic category, 4) Bj (which identify the amount of traffic that should be transmitted to fulfill the requirement of transmission rate or prioritisedBitRate), and 5) the delay or QoS related parameters such as packet delay budget (PDB) or the number of relay hops of the source UE. Besides, UE may further consider the configuration/property of uplink grant/sidelink grant into account. For example, the uplink grant/sidelink grant may prioritize a certain traffic characteristic, e.g. (de)-prioritize relay traffic over non-relay traffic. The prioritization information of a radio resource (i.e., uplink grant or sidelink grant) could be indicated/provided in one of RRC message, MAC CE, or DCI by the base station, or can be provided in one of PC5-RRC message, sidelink MAC CE, or SCI (sidelink control information) by a scheduler UE. During the data multiplexing procedure, one or more of the parameters mentioned above are taken into account.

In one embodiment of data multiplexing procedure, each LCH is scheduled with resource based on decreasing order of logical channel priority only. In another embodiment, logical channel priority could be the joint consideration of logical channel priority value and traffic category, which includes (1) whether the traffic is from this UE or is for relaying traffic from other UE, (2) the transmission interface, and (3) whether the traffic belongs to Uu or SL communication (e.g. for V2X). In yet another embodiment, the order to determine priority for resource allocation may be Bj=>traffic category=>LCH priority. First, UE select LCHs with Bj>0; Second, the LCH whose traffic is for Uu is prioritized over those LCH whose traffic is for relay; Third, UE compare the logical channel priority.

The priority order of traffic categories can be determined by the network. Example 1: Based on the selected resource (e.g. via RRC configuration or via the used resource pool) as in step 2. Example 2: a unified priority order of traffic categories is provided regardless of the selected resource. Example 3: Could be either Example 1 or Example 2 depending on different scenarios, e.g. whether it is dynamic grant or configured grant, whether resource pool dedicated for relay is configured by NW or not, whether the logical channel priority of concerned traffic categories is high or not, or whether the message/info to be transmitted in the concerned traffic categories has a special purpose.

Figure 9:
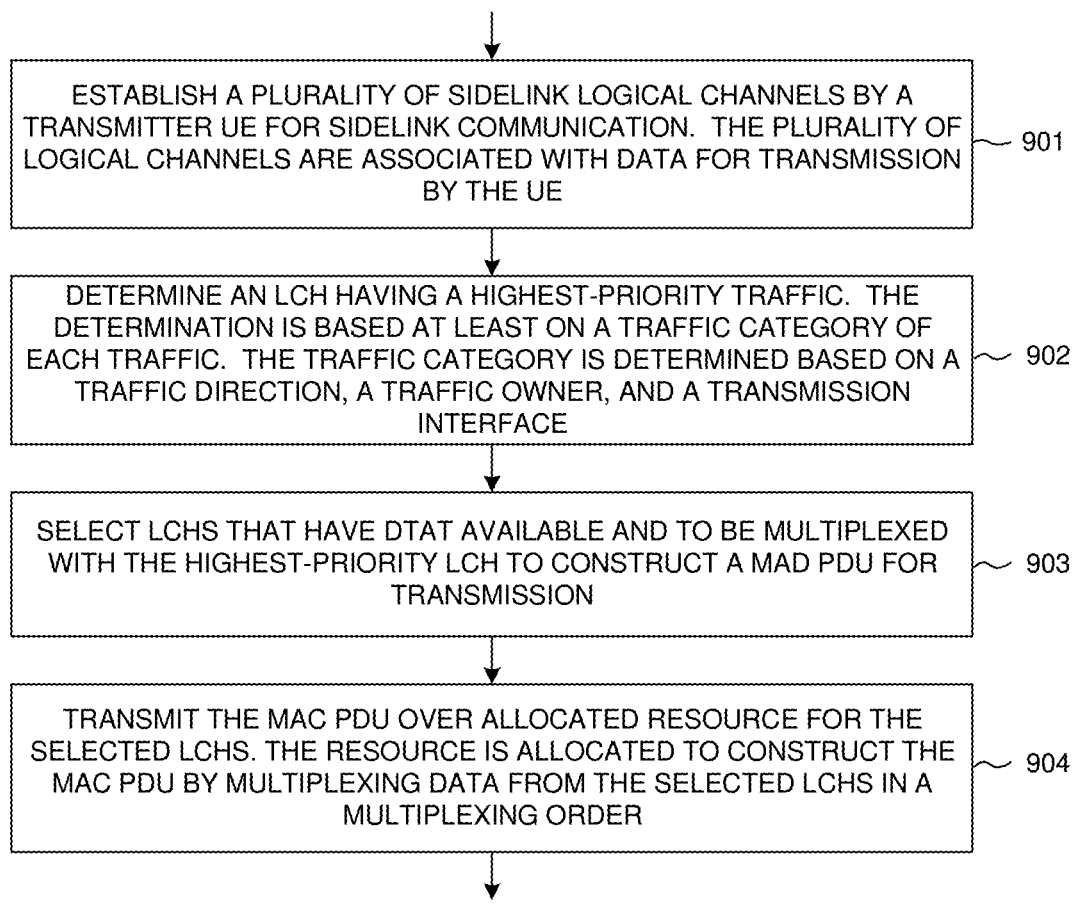
FIG. 9 is a flow chart of a method of LCP enhancement to support sidelink relay in accordance with one novel aspect.

FIG. 9 is a flow chart of a method of LCP enhancement to support sidelink relay in accordance with one novel aspect. In step 901, a transmitter UE (e.g., a relay UE) establishes a plurality of sidelink logical channels (LCHs) for sidelink communication. The plurality of LCHs are associated with data for transmission by the UE. In step 902, the UE determines an LCH having a highest-priority traffic. The determination is based at least on a traffic category of each traffic. The traffic category is determined based on a traffic direction, a traffic owner, and a transmission interface. In step 903, the UE selects LCHs that have data available and are allowed to be multiplexed with the highest-priority LCH to construct a MAC PDU for transmission. In step 904, the UE transmits the MAC PDU over allocated resource for the selected LCHs. The resource is allocated to construct the MAC PDU by multiplexing data from the selected LCHs in a multiplexing order.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    establishing a plurality of sidelink logical channels (LCHs) by a transmitter user equipment (UE) for sidelink communication, wherein the plurality of LCHs are associated with data for transmission by the UE;
    determining an LCH having a highest-priority traffic, wherein the determination is based at least on a traffic category of each traffic, and wherein the traffic category is determined based on a traffic direction, a traffic owner, and a transmission interface;
    selecting LCHs that have data available and are allowed to be multiplexed with the highest-priority LCH to construct a MAC PDU for transmission, wherein the selecting of the LCHs is based on a traffic source UE, a next-hop relay UE, and a traffic category of each LCH; and
    transmitting the MAC PDU over allocated resource for the selected LCHs, wherein the resource is allocated to construct the MAC PDU by multiplexing data from the selected LCHs in a multiplexing order.

2. The method of claim 1, wherein the traffic direction includes uplink, downlink, and sidelink, wherein the traffic owner includes UE itself and other UE, and wherein the transmission interface includes Uu interface and sidelink interface.

3. The method of claim 1, wherein the highest-priority traffic is determined by mapping a traffic priority to an equivalent LCH priority corresponding to the transmission interface.

4. The method of claim 1, wherein the highest-priority LCH is determined based on at least one of an LCH priority, an LCH priority level, a traffic category, an amount of traffic to fulfill a transmission rate requirement, and QoS parameters.

5. The method of claim 1, wherein traffic from different source UEs can be multiplexed, and wherein traffic with different next-hop UEs cannot be multiplexed to form the same MAC PDU.

6. The method of claim 1, wherein the UE is configured with resources that is dedicated based on traffic direction, traffic owner, and transmission interface.

7. The method of claim 6, wherein the UE selects a dedicated resource in accordance with the determined highest-priority traffic.

8. The method of claim 1, wherein the multiplexing order is determined based on at least one of an LCH priority, an LCH priority level, a traffic category, an amount of traffic to fulfill a transmission rate requirement, QoS parameters of a corresponding LCH, and prioritized traffic characteristic specific to the allocated resource for MAC PDU transmission.

9. The method of claim 8, wherein the multiplexing order is determined by a joint consideration of the LCH priority value and the traffic category.

10. A transmitter User Equipment (UE) comprising:
a logical channel (LCH) handling circuit that establishes a plurality of sidelink LCHs for sidelink communication, wherein the plurality of LCHs are associated with data for transmission by the UE;
a control circuit that determines an LCH having a highest-priority traffic, wherein the determination is based at least on a traffic category of each traffic, and wherein the traffic category is determined based on a traffic direction, a traffic owner, and a transmission interface;
a logical channel prioritization (LCP) handling circuit that selects LCHs having data available and allowed to be multiplexed with the highest-priority LCH to construct a MAC PDU for transmission, wherein the selecting of the LCHs is based on a traffic source UE, a next-hop relay UE, and a traffic category of each LCH; and
a transmitter that transmits the MAC PDU over allocated resource for the selected LCHs, wherein the resource is allocated to construct the MAC PDU by multiplexing data from the selected LCHs in a multiplexing order.

11. The UE of claim 10, wherein the traffic direction includes uplink, downlink, and sidelink, wherein the traffic owner includes UE itself and other UE, and wherein the transmission interface includes Uu interface and sidelink interface.

12. The UE of claim 10, wherein the highest-priority traffic is determined by mapping a traffic priority to an equivalent LCH priority corresponding to the transmission interface.

13. The UE of claim 10, wherein the highest-priority LCH is determined based on at least one of an LCH priority, an LCH priority level, a traffic category, an amount of traffic to fulfill a transmission rate requirement, and QoS parameters.

14. The method of claim 11, wherein traffic from different source UEs can be multiplexed, and wherein traffic with different next-hop UEs cannot be multiplexed to form the same MAC PDU.

15. The UE of claim 10, wherein the UE is configured with resources that is dedicated based on traffic direction, traffic owner, and transmission interface.

16. The UE of claim 15, wherein the UE selects a dedicated resource in accordance with the determined highest-priority traffic.

17. The UE of claim 10, wherein the multiplexing order is determined based on at least one of an LCH priority, an LCH priority level, a traffic category, an amount of traffic to fulfill a transmission rate requirement, QoS parameters of a corresponding LCH, and prioritized traffic characteristic specific to the radio resource for MAC PDU transmission.

18. The UE of claim 17, wherein the multiplexing order is determined by a joint consideration of the LCH priority value and the traffic category.

* * * * *